Jan. 8, 1946.  H. L. BROCK ET AL  2,392,573
TRACTOR GENERATOR MOUNTING
Filed Dec. 18, 1944

H. L. Brock
G. L. Simpkins
INVENTORS

BY Edwin C McRae
R C Harris
Attorneys

Patented Jan. 8, 1946

2,392,573

UNITED STATES PATENT OFFICE 2,392,573

TRACTOR GENERATOR MOUNTING

Harold L. Brock, Detroit, and Glenn L. Simpkins, Milan, Mich., assignors to Ford Motor Company, Dearborn, Mich., a corporation of Delaware Application December 18, 1944, Serial No. 568,762

1 Claim. (Cl. 180—1)

This invention relates to the mounting of belt-driven accessories on tractors and like vehicles; and, more particularly, to the mounting of such accessories in position where occasional interference may exist with other components of the mechanism.

While this invention is designed to be used with, and finds particular application in tractors employing adjustable front wheel supports of the type shown in U. S. Patent 2,247,725, and used on the present Ford tractor, it may be employed to equal advantage in other locations with such accessories subjected to occasional interference to insure their return to proper operating positions. In the tractor construction noted, the front axle is mounted on a horizontal king pin and is comparatively free to rotate in a vertical plane. The axle itself is made in telescoping sections, which can be extended to change the front wheel tread and is retained in selected position relative to the frame of the tractor by radius rods pivoted rearwardly on the engine transmission case and forwardly on the axis. The usual dirigible wheel spindles are supported at the outer ends of the axle and steering for any degree of lateral displacement is obtained through a steering arm and steering rod on each side, the steering rods being mounted for arcuate parallel movement corresponding to the radius rods. This construction will be clear by reference to the noted patent, but it is not shown in detail here since it is not, as such, a part of this invention. The reason for referring to it here is the fact that in operation over rough ground, the tractor axle has considerable amplitude of pivotal movement in the vertical sense about the king pin; and, as a result, the steering rod (which is preferably mounted above the axle and the radius rod and moves with them) is likely to interfere with the tractor engine or accessories on it. It has been found that the generator, particularly, when mounted in the usual position for drive by the fan belt, is subject to such interference. Therefore, an advantage of this invention is that the generator or like belt-driven accessory can be mounted in the usual position and even though interference occurs, the resulting displacement will only be temporary and the generator will then be returned to its normal position and operate in the usual manner. This is much to be preferred to a rigid mounting which is almost impossible to maintain, and which will necessarily damage either the accessory or the interfering component. While, superficially, the construction bears some resemblance to a belt-tightening device, its actual construction and its function are considerably different and it does not operate as a resilient tensioning member at all; but rather as a relief member functioning under excessive load and restoring the accessory to a normal position as soon as that load is removed. When this construction is used, difficulties which have been encountered heretofore with displacement of the generator are avoided and the generator is free to operate in a normal way, subject only to short periods of displacement which have no effect upon the over-all functioning of the accessory.

With these and other objects in view, this invention consists in the arrangement, construction and combination of various parts of the improved device described in the specification, claimed in the claim, and illustrated in the accompanying drawing, in which:

Figure 1:
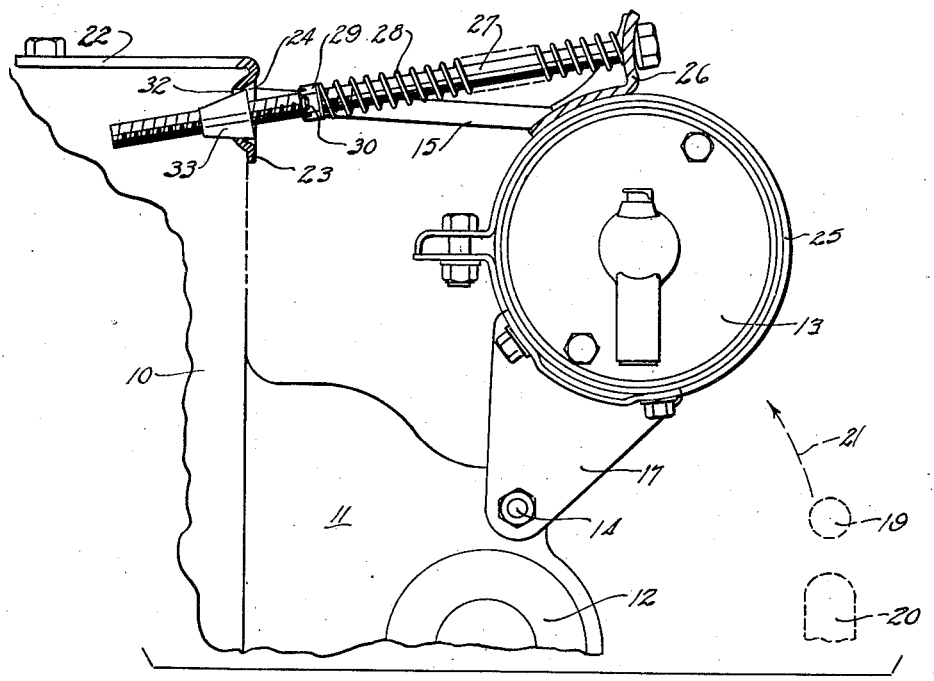
Figure 1 is a partial elevation looking toward the front of the engine taken approximately on the line 1—1 of Figure 2.
Figure 2:
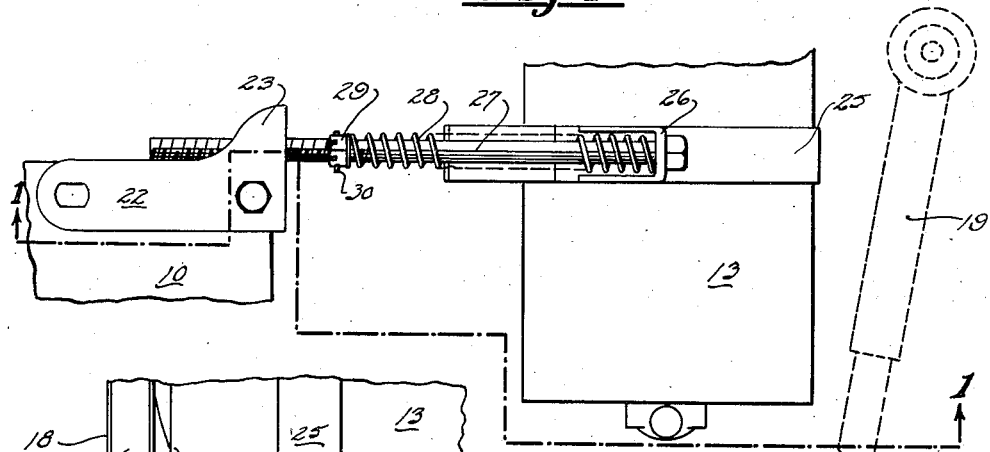
Figure 2 is a partial plan view of the forward right corner of the engine block and the associated generator mounted thereon.
Figure 3:
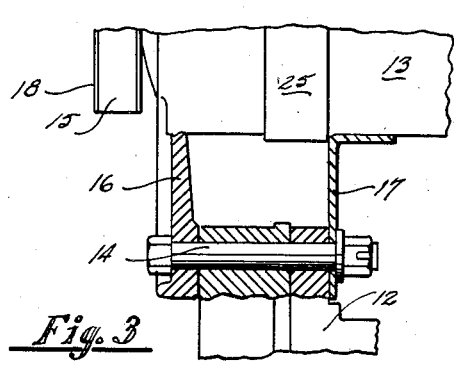
Figure 3 is a transverse vertical section through the generator mounting.

Referring to Figure 1, 10 indicates the engine block, 11 a lateral extension thereof supporting the engine governor 12, and 13 is the generator pivotally mounted by the bolt 14 on the extension 11. The generator 13 is driven by a belt, the upper reach of which is shown at 15, leading to the usual driven pulley on the fan shaft. The lower reach leading to the crankshaft drive pulley is hidden in the particular views chosen. The generator 13 is roughly cylindrical in shape and is supported by a pair of brackets, the forward one 16 being formed integrally with the end plate of the generator, and the rear bracket 17 being shaped and welded to the generator housing. The generator has a pulley 18, shown in Figure 3, and is free to pivot about a horizontal axis, longitudinal of the tractor, provided by the bolt 14, as shown in that figure. In Figures 1 and 2, the approximate position of the steering rod 19 and the radius rod 20 are shown in dotted line and the course which they follow when the axle is displaced about the central king pin, is indicated by the dotted arrow 21. It is apparent from the relationship shown in Figure 1, that when the axle is displaced a substantial amount of interference may exist between the steering rod 19 and the generator 13, and the generator will tend to be rotated about the pivot afforded by the bolt 14.

To control this a resilient abutment is provided.

This includes a bracket 22 bolted to the top of the block 10 adjacent the forward right-hand edge of the block and having a depending lip 23 which extends forwardly of the block and has a depression 24 formed in the extending portion. A band 25 is bolted around the body of the generator and brought into close frictional engagement with it. A U-shaped bracket 26 is welded to the top portion of the band and a bolt 27 extends through the bracket 26 and through an aperture 32 in the depression 24 in the bracket 22. A cone-shaped bearing member 33 is threaded on the bolt 27 and is seated in the depression 24 and may be adjusted to vary the effective length of the bolt. A spring 28 is interposed between the inner surface of the bracket 26 and the nut 29 threaded on the bolt. The spring 28 is characterized by a very slight deflection under loads of the magnitude imposed by the driving belt. In fact, it is so stiff that, for all practical purposes, the drive may be considered as nonresilient and in operation the generator is rigidly supported by the pivot afforded by the bolt 14 and the resistance of the spring 28. As continuous adjustment is not intended, the nut 29 is turned up to preload the spring the desired amount and is secured in the selected position by the cotter 30. Thus, when the tractor leaves the factory the length of the bolt and the effective resistance exerted by the spring are so related that the generator is rigidly mounted to all intents and purposes as to any forces imposed on it by the driving belt. However, the magnitude of the force imposed on the generator housing when it is struck by the steering rod in use, as compared to the pull of the belt is enormous, and it is to meet this contingency that the spring 28 is provided. When the axle is tilted and, as a result, interference occurs between the generator and steering rod, the spring permits the relatively free deflection of the generator under the impact of the steering rod. Thereafter, the generator is then at once restored by the spring action to its original position. The difference in function between this and an ordinary belt tightener will be apparent from the foregoing. In a belt tightener, the belt is always in driving position on the pulley, else the spring is not deflected. Here, when the spring is deflected, the pulley is free from the belt and the drive is intermittent. Thus, there is distinction both in the actual physical construction, depending upon the very heavy spring used; and in the operation in that when the device is functioning, the belt is free from driving engagement with the pulley.

The advantage of the foregoing is that while the generator is permanently mounted so far as the drive is concerned, it is still resilient as to the shocks which may be imposed upon it by interference between the generator and other portions of the vehicle. It is, therefore, unnecessary to try to retain an absolutely rigid mounting of the accessory, which would only result in extended damage to it when such interference occurs. The present mounting is sufficiently inflexible so far as driving efficiency is concerned, but sufficiently resilient to prevent damage from interference and does not require continuous adjustment. The device shown is particularly adaptable for application to existing tractors since it can be readily bolted to the engine block and generator.

Some changes may be made in the arrangement, construction and combination of various parts of the improved device without departing from the spirit of the invention, and it is the intention to cover by the claim such changes as may reasonably be included within the scope thereof.

The invention claimed is:

In a tractor construction, an engine, a front axle mounted for pivotal movement about an axis extending longitudinally of the tractor, a steering rod pivotally connected to said axle at a point spaced laterally from said axis, said steering rod extending generally longitudinally and having a substantial range of arcuate movement when said axle is rocked about its axis by reason of ground irregularities, a generator mounted on one side of said engine and within the extreme range of arcuate movement of said steering rod so as to be subject to occasional interference therewith, said generator being freely pivoted on said engine on a longitudinal axis, a belt driving said generator from said engine, a bracket fixedly secured to said generator at a point remote from its pivotal mounting, a second bracket on said engine, a bolt extending between and engaging said brackets, a compression coil spring on said bolt arranged to urge said generator away from said engine, said spring being relatively stiff and having such resistance to deflection as to be substantially incompressible under loads of the magnitude imposed thereon by said belt and to render said generator mounting substantially rigid as to any such loads, said spring, however, permitting pivotal movement of said generator toward said engine when subjected to the substantially greater force imposed upon said generator when extreme pivotal movement of said axle causes said steering rod to strike said generator and also being effective to restore said generator to its original position when such interference terminates.

HAROLD L. BROCK.
GLENN L. SIMPKINS.